United States Patent Office 3,351,482
Patented Nov. 7, 1967

3,351,482
SYNTHETIC TEXTILES BRIGHTENED WITH
3-PHENYL-7-HYDROXY-COUMARIN
Roderich Raue, Leverkusen, Germany, assignor to Farbenfabriken Bayer Aktiengesellschaft, Leverkusen, Germany, a corporation of Germany
No Drawing. Filed Aug. 11, 1965, Ser. No. 479,007
3 Claims. (Cl. 117—33.5)

This application is a continuation-in-part application of my co-pending application Ser. No. 90,620 filed Feb. 21, 1961, now abandoned.

The present invention relates to coumarin compounds; more particularly it concerns a process in which 3-phenyl-7-hydroxy-coumarin compounds of the general formula

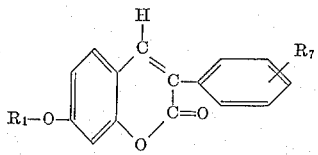

wherein $R_1$ is alkyl, hydroxy alkyl, alkoxy alkyl, halo alkyl, cyano alkyl, carboxy alkyl, sulfo alkyl, alkenyl, aralkyl, aryl, arylketoalkyl or the grouping

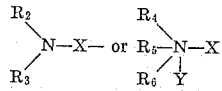

wherein $R_2$ and $R_3$ indicate independently of one another hydrogen, alkyl, substituted alkyl, cycloalkyl, alkenyl or aralkyl, $R_4$, $R_5$ and $R_6$ are independent of one another alkyl, substituted alkyl or aralkyl and $R_7$ is hydrogen, chloro, carboxy, carbalkoxy or

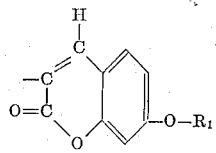

whereas X stands for a bivalent alkylene residue having 1 to 4 carbon atoms and Y is an inorganic or organic acid residue, are applied as optical bleaching agents to materials from polyacrylonitrile or synthetic polyesters.

The aromatic rings contained in the coumarin compounds to be applied according to the invention may contain further substituents except for the nitro group, for example halogens, alkyl, aralkyl, or aryl groups, alkoxy, the residue —NHCO-alkyl, —NHCO-aryl, —NHCONH-alkyl, or —NHCONH-aryl and the carboxyl group which may be esterified.

The 3-phenyl-7-hydroxy-coumarin compounds to be applied as optical bleaching agents in the process of the invention can be obtained according to various processes, for instance by reacting 2,4-dihydroxy-benzaldehyde or its substitution products with phenylacetic acid or its functional derivatives and substitution products in a manner known as such.

As suitable substitution products of 2,4-dihydroxy-benzaldehyde, there may be mentioned the following, for example: 5-methyl-2,4-dihydroxy-benzaldehyde, 5-chloro-2,4-dihydroxy-benzaldehyde, 5 - bromo - 2,4 - dihydroxy-benzaldehyde, 5-methoxy-2,4-dihydroxy-benzaldehyde, 5-acetylamino-2,4-dihydroxy-benzaldehyde, 4 - methoxy-2-hydroxy-benzaldehyde, 4-ethoxy-2-hydroxy-benzaldehyde, 4-benzyloxy-2-hydroxy-benzaldehyde. As suitable functional derivatives and substitution products of phenylacetic acid, there may be mentioned for instance benzyl cyanide, 4-chlorobenzyl cyanide, 3-bromobenzyl cyanide, 4-methoxybenzyl cyanide, 4-aminobenzyl cyanide, 4-acetylamino-benzyl cyanide, the methyl, ethyl, propyl, or butyl esters or phenylacetic acid of 2-chloro-phenylacetic acid, of 4-methoxyphenylacetic acid, or of 4-acetylamino-phenylacetic acid.

If the hydroxy group at the 7-position in the coumarin ring system thus formed is still free, it is then reacted in an alkaline medium—for example in presence of sodium hydroxide, sodium carbonate, potassium carbonate, sodamide, or sodium methylate—with alkylating agents, for instance with dimethyl sulfate, diethyl sulfate, methyl iodide, ethyl iodide, isopropyl iodide, butyl bromide, allyl bromide, benzyl chloride, ω-chloracetophenone, chloracetamide, methylene bromide, 2-dimethyl-amino-ethyl chloride, or 2-diethylamino-ethyl chloride.

When tertiary amino groups present in the coumarin compounds are to be quaternised, the coumarin compounds are dissolved in an inert solvent, for example in acetone, toluene, chlorobenzene, or chloroform, and are then reacted with a quaternising agent, for instance with dimethyl sulfate, diethyl sulfate, methyl iodide, ethyl iodide, butyl bromide, benzyl chloride, or 4-toluene-sulfonic acid methyl and ethyl ester.

The 3-phenyl-7-hydroxy-coumarin compounds of the present invention can be applied as optical bleaching agents to materials from polyacrylonitrile or synthetic polyesters in the usual manner, for instance in the form of solutions in water or in organic solvents, or in the form of aqueous dispersions whereby use may be made as dispersing agents of, for instance, condensation products from naphthalene-sulfonic acids and formaldehyde. The brightening agents can also be used in combination with washing agents. Furthermore, they may also be added to spinning or extrusion compositions which serve for the production of fibres, threads, films, or other shaped products from polyacrylonitrile or synthetic polyesters.

The brightening effect obtained by the process of the present invention on materials from polyacrylonitrile or synthetic polyesters is excellent. Moreover, it is very stable to light and also stable to bleaching liquors containing chlorites. These valuable properties are not exhibited to the same extent by the coumarin compounds previously proposed as brightening agents for materials from polyacrylonitrile or synthetic polyesters.

The following examples serve to illustrate the invention without, however, limiting the scope thereof; the parts given are parts by weight.

*Example 1*

Polyacrylonitrile fibres are introduced at a goods-to-liquor ratio of 1:40 into an aqueous bath which contains, per litre, 1 g. of oxalic acid, 1 g. of sodium chlorite, as well as 0.05 g. of 3-phenyl-7-methoxy-coumarin or 3-phenyl-7-ethoxy-coumarin, as brightening agent. The bath is then heated up to boiling during 20 minutes and maintained at this temperature for 45 to 60 minutes. Thereafter, the polyacrylonitrile fibres are rinsed and dried. The fibres are excellently brightened, and the brightening is very stable to light.

The specified brightening agents were prepared by the following method:

16 parts of 2,4-dihydroxy-benzaldehyde, 25 parts of sodium phenylacetate, and 60 parts of acetic anhydride were heated slowly until the mixture boiled under reflux. After the reaction mixture had been heated to boiling under reflux for another 6 hours, it was allowed to cool somewhat, and added with stirring to 500 parts of water. After stirring for several hours, the resulting precipitate was filtered by suction, and washed with water. The 3-phenyl-7-acetoxy-coumarin obtained after recrystallisation from dioxane melted at 182–184° C.

18.8 parts of 3-phenyl-7-acetoxy-coumarin were heated to boiling under reflux for 10 minutes with 150 parts of alcohol. After the mixture had been cooled to 65° C., it was treated dropwise with 30 parts of 10% aqueous sodium hydroxide solution, and then heated further, whereupon the starting material dissolved. After heating for one hour under a reflux condenser, the dark coloured solution was poured into 1000 parts of water, clarified with animal charcoal, and acidified with 50 parts of 10% hydrochloric acid. The separated precipitate was filtered off by suction and washed. The 3-phenyl-7-hydroxy-coumarin obtained after recrystallisation from methanol melted at 215–218° C.

9.0 parts of 3-phenyl-7-hydroxy-coumarin were dissolved, by warming, in 80 parts of alcohol, and the solution was treated dropwise with 35 parts of a 10% sodium carbonate solution, and thereafter with 7.1 parts of dimethyl sulfate, or with 8.6 parts of diethyl sulfate. After the reaction mixture had been heated to boiling for 1 hour, whilst cooling under reflux, it is cooled. The precipitate separating thereby is filtered off by suction, and after recrystallisation from methanol yielded 3-phenyl-7-methoxy-coumarin of melting point 125–126° C. and 3-phenyl-7-ethoxy-coumarin of melting point 164–165° C., respectively.

*Example 2*

A stock solution is prepared from 10 parts of polyacrylonitrile, 80 parts of dimethylformamide, and 10 parts of one of the brightening agents specified in Example 1; this is added to a normal polyacrylonitrile spinning solution at an amount so that the concentration of the brightening agent in the spun polyacrylonitrile material amounts to 0.25 percent by weight. The spinning solution is then spun in the usual manner, and the resulting fibre material is bleached in a bath containing sodium chlorite. The whitening effect thus attained is excellent.

*Example 3*

Polyester fibres prepared from terephthalic acid and glycol are treated at a goods-to-liquor ratio of 1:40 in a bath which contains, per litre, 1 g. of oleyl-alcohol sulfonate, 0.75 g. of formic acid, and 0.025 g. of one of the alkylation products of 3-phenyl-7-hydroxy-coumarin, described below, as brightening agent. Thereafter, the bath is heated to boiling and maintained at this temperature for 30–60 minutes. After rinsing and drying, the polyester fibres exhibit excellent brightening.

The alkylation products of 3 - phenyl - 7 - hydroxy-coumarin were obtained by the following method:

A mixture of 11.9 parts of 3-phenyl-7-hydroxy-coumarin, 110 parts of alcohol, 46 parts of a 10% aqueous solution of sodium carbonate, as well as 10.3 parts of butyl bromide or 12.8 parts of isopropyl iodide or 9.1 parts of allyl bromide or 6.0 parts of ethylene chlorohydrin was warmed in a pressure vessel up to 110–115° C. during 30 minutes, and stirred at 110–115° C. for 3 hours, whereupon an excess pressure of 5 atmospheres was established. The reaction mixture was then cooled and the precipitated product was separated, washed with water, and purified by recrystallisation from alcohol or acetonitrile.

The melting points of the alkylation products thus obtained are reproduced in the following table:

| Alkylating agent: | Melting point of alkylation product, ° C. |
|---|---|
| Butyl bromide | 114–116 |
| Isopropyl iodide | 119–122 |
| Allyl bromide | 145–147 |
| Ethylene chlorohydrin | 186–188 |

*Example 4*

Polyester fibres prepared from terephthalic acid and glycol are treated at a goods-to-liquor ratio of 1:40 in a bath which contains, per litre, 1 g. of oleyl-alcohol sulfonate, 0.75 g. of formic acid, and 0.025 g. of one of the alkylation products of 3-phenyl-7-hydroxy-coumarin, described below, as brightening agent. Thereafter, the bath is heated to boiling and maintained at this temperature for 30–60 minutes. After rinsing and drying, the polyester fibres exhibit excellent brightening.

The two brightening agents had been obtained by the following method:

11.9 parts of 3-phenyl-7-hydroxy-coumarin were dissolved by warming in 100 parts of dioxane, and treated whilst stirring with 3 parts of finely powdered sodamide. The resulting sodium salt of 3-phenyl-7-hydroxy-coumarin was then filtered off by suction, and introduced into 50 parts of benzyl chloride or into 50 parts of ω-chloracetophenone. After the mixture had been heated at 130° C. for 8 hours with stirring, the excess of alkylating agent was distilled off in steam, and the residual reaction mixture was cooled. The separated alkylation product of 3-phenyl-7-hydroxy-coumarin was first ground with methanol, and then recrystallised from acetonitrile. The alkylation product obtained with benzyl chloride melted at 146–148° C., whilst the alkylation product obtained with ω-chloracetophenone exhibited a melting point of 175–176° C.

*Example 5*

Polyacrylonitrile fibres are introduced at a goods-to-liquor ratio of 1:40 into an aqueous bath which contains, per liter, 1 g. of a surface active paraffin sulfonate, 0.75 g. of formic acid, and 0.05 g. of the alkylation product of 3-phenyl-7-hydroxy-coumarin described below, as brightening agent. The processing bath is heated up to boiling during 20–30 minutes, and maintained at this temperature for 30–60 minutes. Thereafter, the polyacrylonitrile fibres are rinsed and dried. The fibres are then excellently brightened.

The employed brightening agent had been prepared by the following method:

A solution of 11.9 parts of 3-phenyl-7-hydroxy-coumarin in 100 parts of dioxane was treated with 3 parts of finely powdered sodamide and heated to boiling. Thereupon, the mixture was treated dropwise with 10.2 parts of 2-diethylaminoethyl chloride, and heated to boiling for 3 hours whilst cooling under reflux. The reaction mixture was then poured into 1500 parts of water. After stirring for several hours, the resulting precipitate was filtered off by suction and recrystallised from methanol. The alkylation product of 3-phenyl-7-hydroxy-coumarin thus obtained, 3-phenyl-7-(2'-diethylaminoethoxy)-coumarin, melted at 70–72° C.

*Example 6*

Polyacrylonitrile fibres are introduced at a goods-to-liquor ratio of 1:40 into an aqueous bath which contains, per litres, 1 g. of oxalic acid, 1 g. of sodium chlorite, as well as 0.05 g. of the brightening agent specified below. The bath is then heated up to boiling during 20 minutes, and maintained at this temperature for 45–60 minutes. Thereafter, the polyacrylonitrile fibres are rinsed and dried. The fibres are excellently brightened.

The employed brightening agent had been prepared by the following method:

6.5 parts of 3 - phenyl - 7 - (2' - diethylaminoethoxy)-coumarin as described in Example 5 are dissolved in 20 parts of acetone and treated dropwise with 2.5 parts of dimethyl sulphate. The reaction mixture is then heated to boiling for an hour whilst cooling under reflux, it is cooled, and the quaternising product of 3-phenyl-7-(2'-diethylaminoethoxy)-coumarin of melting point 78–84° C. is isolated.

*Example 7*

Polyacrylonitrile fibres are introduced at a goods-to-liquor ratio of 1:40 into an aqueous bath which contains, per litre, 1 g. of oxalic acid, 1 g. of sodium chlorite, as well as 0.05 g. of 3-(p-methylphenyl)-7-methoxy-coumarin as brightening agent. The bath is then heated up to boiling during 20 minutes, and maintained at this temperature for 45–60 minutes. Thereafter, the polyacrylonitrile fibres are rinsed and dried. The fibres are excellently brightened, the brightening is very stable to light.

The specified brightening agent had been prepared by the following method:

93 parts of dimethyl sulfate were treated dropwise at 20–30° C. during one hour with a solution of 44.2 parts of 3-(p-methylphenyl)-7-hydroxy-coumarin in a mixture of 140 parts of methanol and 15.5 parts of a 45% sodium hydroxide solution, whilst stirring constantly; thereafter, the mixture was kept at room temperature for another 3 hours at pH 7–8 by addition of a 10% sodium hydroxide solution. The pH value was adjusted to 9 with sodium hydroxide solution, and the methylation product which had crystallised out was filtered off by suction, washed with a very dilute sodium hydroxide solution and also with water, and thereafter dried. After recrystallisation from boiling glycol-monomethyl-ether acetate, the brightening agent was obtained in the form of a bright yellow, green-tinted crystalline powder of melting point 146–147° C.

The preparation of 3-(p-methylphenyl)-7-hydroxy-coumarin was carried out according to the method detailed in Example 1 for 3-phenyl-7-hydroxy-coumarin, except for the difference that in place of the 25 parts of sodium phenylacetate specified in Example 1, paragraph 3, use was made of 28 parts of sodium p-methylphenyl-acetate and that in place of the 18.8 parts of 7-acetoxy-3-phenyl-coumarin specified in Example 1, paragraph 4, use was made of 19.7 parts of 3-(p-methylphenyl)-7-acetoxy-coumarin. 3-(p - methylphenyl) - 7 - acetoxy - coumarin melted at 184–185° C., and 3-(p-methylphenyl)-7-hydroxy-coumarin at 276–278° C.

Example 8

Polyacrylonitrile fibres are introduced at a goods-to-liquor ratio of 1:40 into an aqueous bath which contains, per litre, 1 g. of oxalic acid, 1 g. of sodium chlorite, as well as 0.05 g. of 3-phenyl-5-methyl-7-methoxy-coumarin or 3-phenyl-6-methyl-7-methoxy-coumarin as brightening agent. The bath is heated up to boiling during 20 minutes. Thereafter, the polyacrylonitrile fibres are rinsed and dried. The fibres are excellently brightened, the brightening is very stable to light.

The specified brightening agents had been prepared by the following method:

15.1 parts of 2,4-dihydroxy-6-methyl-benzaldehyde, 21.3 parts of sodium phenylacetate, and 55 parts of acetic anhydride were heated slowly until the mixture boiled under reflux. After the reaction mixture had been heated to boiling under the reflux for 6 hours, it was allowed to cool somewhat, and added, with stirring, to 500 parts of water. The mixture was stirred until the acetic anhydride had been decomposed, the resulting precipitate was filtered off by suction, and washed with water. The 3-phenyl-5-methyl-7 - acetoxy - coumarin thus obtained melted at 151–153° C. after recrystallisation from a mixture of alcohol and acetonitrile.

14.3 parts of 3-phenyl-5-methyl-7-acetoxy-coumarin were boiled under reflux for 10 minutes with 100 parts of alcohol. After the mixture had been cooled to 65° C., 33 parts of 10% sodium hydroxide solution were added dropwise, and the mixture was then further heated, whereupon the precipitate dissolved. After boiling under reflux for one hour, the solution was poured into 500 parts of water, clarified with animal charcoal, and acidified, after cooling, with 46 parts of 10% hydrochloric acid. The separated precipitate was then filtered off by suction, washed, dried, and recrystallised from a mixture of methanol and acetonitrile. The 3-phenyl-5-methyl-7-hydroxy-coumarin melted at 236–238° C.

7.4 parts of 3-phenyl-5-methyl-7-hydroxy - coumarin were heated to boiling under reflux for 10 minutes with 80 parts of alcohol, and the suspension was then treated dropwise with 27 parts of 10% sodium carbonate solution. Thereafter, the reaction mixture was treated dropwise with 5.5 parts of dimethyl sulfate without further heating, and then heated to boiling under reflux for another hour. The resulting crystalline precipitate was filtered off by suction, washed with water, dried, and recrystallised from acetonitrile. The 3-phenyl-5-methyl-7-methoxy-coumarin melted at 159–161° C.

When in place of 2,4-dihydroxy-6-methyl-benzaldehyde, use was made of 2,4-dihydroxy-5-methyl-benzaldehyde, 3-phenyl-6-methyl-7-methoxy-coumarin (M.P. 158–163° C.) was obtained via the intermediate stages of 3-phenyl-6-methyl-7-acetoxy-coumarin (M.P. 155–158° C., from acetonitrile) and 3-phenyl-6-methyl-7-hydroxy-coumarin (M.P. 259–263° C., from alcohol).

Example 9

Polyester fibres prepared from terephthalic acid and glycol are treated at a goods-to-liquor ratio of 1:40 in a bath which contains, per litre, 1 g. of oleyl-alcohol sulfonate, 0.75 g. of formic acid, and 0.03 g. of 3-(4'-chlorophenyl)-7-methoxy-coumarin as brightening agent. Thereafter the bath is heated to boiling and maintained at this temperature for 30–60 minutes. After rinsing and drying, the polyester fibres exhibit excellent brightening.

The specified brightening agent had been prepared by the following method:

A mixture of 30.5 parts of sodium 4-chlorophenyl-acetate and 60 parts of acetic anhydride was treated with 16 parts of 2,4-dihydroxy-benzaldehyde, whereupon the temperature rose to 60° C. The reaction mixture was then slowly heated to boiling, and was allowed to boil for 6 hours with cooling under reflux. After cooling, the mixture was treated, whilst stirring, with 500 parts of water and was then further stirred for several hours. The precipitate which thereupon separated was filtered off by suction, washed with water, dried, and recrystallised from dioxane. The resulting 3-(4'-chlorophenyl)-7-acetoxy-coumarin melted at 202–203° C.

14.2 parts of 3-(4'-chlorophenyl)-7-acetoxy-coumarin were boiled for 10 minutes, whilst cooling under reflux, with 100 parts of alcohol, and 38 parts of 10% sodium hydroxide solution added dropwise to the suspension. The mixture was heated to boiling for one hour under a reflux condenser whereupon the starting material dissolved. The solution was then poured into 1000 parts of water, clarified with animal charcoal, and acidified with 42 parts of 10% hydrochloric acid. The separated precipitate was filtered off by suction and washed. The 3-(4'-chlorophenyl)-7-hydroxy-coumarin melted at 298–301° C.

2 parts of 3-(4-chlorophenyl) - 7 - hydroxy-coumarin were heated to boiling for 10 minutes with 50 parts of alcohol whilst cooling under reflux, and then treated dropwise with 9 parts of 10% sodium carbonate solution. Thereafter 1.8 parts of dimethyl sulfate were added dropwise without further supply of heat, whereupon ample crystals separated. The reaction mixture was heated to boiling for 2 hours, whilst cooling under reflux, cooled, and the reaction product was isolated. After recrystallisation from alcohol, 3-(4'-chlorophenyl)-7-methoxy-coumarin melted at 184–185° C.

Example 10

Polyester fibres from terephthalic acid and glycol are treated at a goods-to-liquor ratio of 1:40 in a bath which contains, per litre, 1 g. of oleyl-alcohol sulfonate, 0.75 g. of formic acid, and 0.075 g. of 3-phenyl-5,7-dimethoxy-coumarin, as brightening agent. Thereafter, the bath is heated to boiling, and is maintained at this temperature for 30–60 minutes. After rinsing and drying, the polyester fibres exhibit excellent brightening.

The specified brightening agent was prepared by the following method:

17.6 parts of 2,4,6-trihydroxy-benzaldehyde, 25 parts of sodium phenylacetate, and 60 parts of acetic anhydride were slowly heated, whilst cooling under reflux. After the reaction mixture had been heated to boiling for another 6 hours, it was somewhat cooled and added, with stirring, to 500 parts of water. The resulting precipitate was filtered off by suction after being stirred for several hours, and washed with water. When recrystallised from dioxane, 3-phenyl-5,7-diacetoxy-coumarin melted at 143–147° C.

22.7 parts of 3-phenyl-5,7-diacetoxy-coumarin were heated to boiling for 10 minutes with 150 parts of alcohol, whilst cooling under reflux, and then treated dropwise with 140 parts of a 10% sodium carbonate solution. After boiling for one hour under a reflux condenser—whereupon the starting material dissolved—the solution was added to 1000 parts of water, heated to boiling, clarified with animal charcoal, and, after cooling, acidified with 165 parts of 10% hydrochloric acid. The separating precipitate was filtered off by suction, washed till neutral, and recrystallised from methanol. The melting point of 3-phenyl-5,7-dihydroxy-coumarin was at 267–271° C.

5.5 parts of 3-phenyl-5,7-dihydroxy-coumarin were dissolved at room temperature in 65 parts of alcohol, and treated dropwise with 22 parts of a 10% sodium carbonate solution. Thereupon, the reaction mixture was treated with 4.3 parts of dimethyl sulfate, and then stirred, firstly for half an hour at room temperature and thereafter for one hour whilst boiling under a reflux condenser. The separated crystals were filtered off by suction, washed with water, dried, and recrystallised from a mixture of alcohol and acetonitrile. The 3-phenyl-5,7-dimethoxy-coumarin thus obtained melted at 185–186° C.

*Example 11*

Polyester fibres prepared from terephthalic acid and glycol are treated at a goods-to-liquor ratio of 1:40 in a bath which contains, per litre, 1 g. of oleyl-alcohol sulfonate, 0.75 g. of formic acid, and 0.1 g. of a mixture of 3-phenyl-7-methoxy-coumarin and 3-phenyl-7-ethoxy-coumarin, as brightening agent. Thereafter, the bath is heated to boiling, and maintained at this temperature for 30–60 minutes. After rinsing and drying, the polyester fibres exhibit excellent brightening.

The specified brightening agent had been prepared by the following method:

A mixture of 180 parts of acetic anhydride and 57.6 parts of phenylacetic acid were treated, in small portions, with 17.4 parts of powdered sodium hydroxide, whereby cooling ensured that the temperature did not rise to more than 70° C. Thereupon, 48 parts of 2,4-dihydroxy-benzaldehyde were added to the reaction mixture, with stirring. The resulting homogeneous solution was heated at 175–180° C. for 6 hours in an autoclave made of acid resistant steel, whereupon an excess pressure of 6–7 atmospheres became established. After cooling, the reaction mixture was added to 1500 parts of water and stirred for some time in order to decompose the acetic anhydride. The resulting precipitate was then filtered off by suction, washed with water, and dried. The crude product was heated to boiling for 3 hours with 300 parts of alcohol whilst cooling under reflux, and after cooling it was filtered by suction. There are obtained 31.6 parts of 3-phenyl-7-acetoxy-coumarin of melting point 183–185° C.

28.0 parts of 3-phenyl-7-acetoxy-coumarin were heated to boiling for 10 minutes with 260 parts of alcohol whilst cooling under reflux. 120 parts of 10% sodium carbonate solution were added dropwise to this suspension, and the resulting reaction mixture was heated to boiling for 1 hour, whilst cooling under reflux, whereupon the starting material dissolved. After cutting off the supply of heat, the solution was treated dropwise with a mixture of 12.6 parts of dimethyl sulfate and 15.4 parts of diethyl sulfate, and thereafter heated to boiling for 1 hour whilst cooling under reflux, whereupon a crystalline precipitate was formed. After cooling, the reaction mixture was filtered off by suction, washed with water, and dried.

*Example 12*

Polyester fibres from terephthalic acid and glycol are treated at a goods-to-liquor ratio of 1:40 in a bath which contains, per litre, 1 g. of oleyl-alcohol sulfonate, 0.75 g. of formic acid, and 0.05 g. of the brightening agent described below. Thereafter the bath is heated to boiling, and is maintained at this temperature for 30–60 minutes. After rinsing and drying, the polyester fibres exhibit a greenish tint.

The specified agent was prepared by the following method:

32 parts of 2,4-dihydroxybenzaldehyde were added to a mixture of 35 parts of sodium salt of phenylene-1,4-diacetic acid and 120 parts of acetic anhydride. The reaction mixture was heated to boiling within ½ hour, then boiled under reflux for 6 hours and thereafter added to 1000 parts of water. The pale yellow crystalline precipitate was filtered off by suction after having been stirred for several hours, washed with water and dried. The obtained coumarin compound of the formula

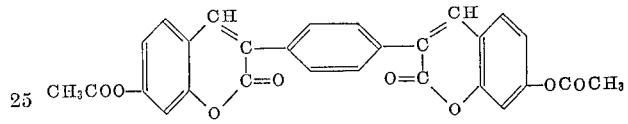

melts at 307–308° C.

*Example 13*

Polyacrylonitrile fibres are introduced at a goods-to-liquor ratio of 1:40 into an aqueous bath which contains, per litre, 1 g. of oxalic acid, 1 g. sodium chlorite and 0.05 g. of 3-(4′-ethyl-phenyl)-7-methoxy-coumarin or 0.05 g. of 3-(4′-isopropylphenyl)-7-methoxy-coumarin or 0.05 g. of 3-(3′,4′-tetramethylene-phenyl)-7-methoxy-coumarin as brightening agents. The bath is then heated up to boiling during 20 minutes and maintained at this temperature for 45–60 minutes. Thereafter the polyacrylonitrile fibres are rinsed and dried. The fibres are excellently brightened, and the brightening is very stable to light.

The first mentioned brightening agent 3-(4′-ethylphenyl)-7-methoxy-coumarin was prepared by the following method:

28.5 parts of 2,4-dihydroxybenzaldehyde, 52.4 parts of the sodium salt of 4-ethylphenyl acetic acid and 110 parts of acetic acid anhydride were slowly heated until the mixture boiled under reflux. After the reaction mixture had been heated under reflux for another 22 hours it was allowed to cool somewhat and added with stirring to 1000 parts of water. After stirring for several hours the resulting precipitate was filtered by suction and washed with water. The 3-(4′-ethylphenyl)-7-acetoxy-coumarin formed was recrystallised from a mixture of methanol and aceto-nitrile; it melted at 142–149° C.

43.1 parts of 3-(4′-ethylphenyl)-7-acetoxy-coumarin were heated to boiling under reflux for 10 minutes with 300 parts of alcohol. The mixture was then cooled to 70° C., it was treated dropwise with 75 parts of 10% aqueous sodium hydroxide solution and then heated to boiling under reflux for another hour. Thereupon the dark coloured fluorescing solution was poured into 750 parts of water, clarified wth animal charcoal at boiling temperature, filtered and after cooling acidified with 100 parts of 10% hydrochloric acid. The separated precipitate was filtered off by suction and washed. The 3-(4′-ethylphenyl)-7-hydroxy-coumarin obtained after recrystallisation from methanol melted at 205–212° C.

21.8 parts of the 3-(4′-ethylphenyl)-7-hydroxy-coumarin were dissolved by warming in 240 parts of ethanol and the solution was added dropwise with 80 parts of a 10% sodium carbonate solution and thereafter with 16.4 parts of dimethyl sulfate. After the reaction mixture had been stirred for ½ hour at room temperature it was heated to boiling under reflux for 1 hour whilst cooling. The separated precipitate was filtered off by suction and yielded after recrystallisation from a mixture of ethanol and aceto-nitrile the 3-(4'-ethylphenyl)-7-methoxy-coumarin of the melting point of 133–135° C.

In a similar manner the brightening agent 3-(4'-isopropylphenyl)-7-methoxy-coumarin was prepared. First 2,4-dioxybenzaldehyde was reacted with the sodium salt of 4-isopropylphenyl acetic acid in acetic anhydride to yield 3-(4'-isopropylphenyl)-7-acetoxy-coumarin which after recrystallisation from a mixture of ethanol and aceto-nitrile melted at 135–138° C. By reacting this compound with sodium hydroxide in ethanol the 3-(4'-isopropylphenyl)-7-oxy-coumarin was obtained, which after recrystallisation from ethanol melted at 209–212° C. By reacting this compound with dimethyl sulfate and sodium carbonate in aqueous ethanol the 3-(4'-isopropylphenyl)-7-methoxy-coumarin was obtained which after recrystallisation from ethanol melted at 134–135° C.

The brightening agent 3-(3',4'-tetramethylene-phenyl)-7-methoxy-coumarin was prepared in a similar manner. First 2,4-dioxybenzaldehyde was reacted with sodium salt of 3,4-tetra-methylene-phenyl acetic acid in acetic acid anhydride to yield the 3-(3',4'-tetramethylene-phenyl)-7-acetoxy-coumarin which after recrystallisation from a mixture of ethanol and aceto-nitrile melted at 145–146° C. By reacting this compound with sodium hydroxide in ethanol the 3 - (3',4'-tetramethylene-phenyl)-7-oxy-coumarin was obtained which after recrystallisation from ethanol melted at 209–214° C. This compound was then reacted with dimethyl sulfate and sodium carbonate in aqueous ethanol whereby the 3-(3',4'-tetramethylene-phenyl)-7-methoxy-coumarin was obtained which after recrystallisation from a mixture of ethanol and aceto-nitrile melted at 167–169° C.

*Example 14*

Polyester fibres from terephthalic acid and glycol are treated at a goods-to-liquor ratio of 1:40 in a bath which contains, per litre, 1 g. of oleyl-alcohol sulfonate, 0.75 g. of formic acid, and 0.06 g. of 3-(2',4'-dimethylphenyl)-7-methoxy-coumarin as brightening agent. Thereafter the bath is heated to boiling, and is maintained at this temperature for 30–60 minutes. After rinsing and drying, the polyester fibres exhibit an excellent brightening effect.

The brightening agent was prepared according to the manner described in Example 13 by reacting 2,4-dihydroxybenzaldehyde with the sodium salt of 2,4-dimethylphenyl acetic acid and acetic anhydride, saponifying the resulting 3-(2',4'-dimethylphenyl)-7-acetoxy-coumarin of the melting point 219–221° C. and reacting the 3-(2',4'-dimethylphenyl) - 7 - hydroxy - coumarin of the melting point of 159–161° C. with dimethylsulfate. The brightening agent thus obtained melted after recrystallisation for another 118–120° C.

*Example 15*

Polyester fibres prepared from terephthalic acid and glycol are treated at a goods-to-liquor ratio of 1:40 in a bath which contains, per litre, 1 g. of oleyl alcohol sulfonate, 0.75 g. of formic acid and 0.075 g. of 3-(4'-carbomethoxyphenyl)-7-methoxy-coumarin as brightening agent. Thereafter the bath is heated to boiling and maintained at this temperature for 30–60 minutes. After rinsing and drying the polyester fibres exhibit very good brightening.

The employed brightening agent was prepared by the following method:

27.5 parts of 2,4-dihydroxybenzaldehyde, 60.8 parts of 4-carboxyphenyl acetic acid and 210 parts acetic anhydride were slowly heated until the mixture boiled under reflux. After the reaction mixture had been heated to boiling for 22 hours it was allowed to cool somewhat, and added, with stirring, to 1500 parts of water. The precipitate formed was stirred for several hours and then filtered off with suction. After recrystallising from dimethyl formamide the 3-(4'-carboxyphenyl)-7-acetoxy-coumarin obtained melted above 360° C.

36 parts of 3-(4'-carboxyphenyl)-7-acetoxy-coumarin were boiled under reflux with 200 parts of alcohol for 10 minutes. The mixture was added dropwise with 100 parts of 10% sodium hydroxide solution without heating and thereupon it was heated to boiling under reflux. After the reaction mixture had been boiled under reflux for 1 hour, it was added to 1000 parts of water, heated to boiling, clarified with animal charcoal and after cooling acidified with 130 parts of 10% hydrochloric acid. The separated precipitate was filtered off by suction, washed with water and dried. After recrystallisation from dimethyl formamide the 3-(4'-carboxyphenyl)-7-hydroxy-coumarin thus obtained did not melt up to 360° C.

15.3 parts of 3 - (4' - carboxyphenyl)-7-hydroxy-coumarin were heated to boiling under reflux for 10 minutes with 320 parts of alcohol. 110 parts of 10% sodium carbonate solution were added to the mixture and thereafter 222 parts of dimethyl sulfate were added dropwise without further heating. After the reaction mixture had been stirred at room temperature for half an hour, it was heated to boiling under reflux for one hour. The precipitate separating on cooling was recrystallised from dimethyl formamide. The 3 - (4'-carbomethoxy)-7-methoxy-coumarin thus obtained melted at 233–234° C.

I claim:

1. A material consisting essentially of at least one fiber component selected from the group consisting of polyacrylonitrile and synthetic polyesters, having incorporated therein a visible substantial brightening amount of a compound having the formula

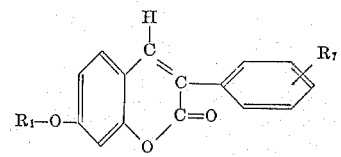

wherein $R_1$ is a member selected from the group consisting of alkyl, hydroxy alkyl, alkoxy alkyl, halo alkyl, cyano alkyl, carboxy alkyl, sulfo alkyl, alkenyl, aralkyl, aryl, arylketo alkyl,

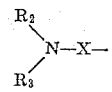

and

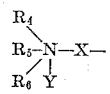

wherein $R_2$ and $R_3$ are members selected from the group consisting of hydrogen, alkyl, substituted alkyl, and aralkyl; $R_4$, $R_5$, and $R_6$ are members selected from the group consisting of alkyl, substituted alkyl, cycloalkyl, alkenyl and aralkyl; $R_7$ is a member selected from the group consisting of hydrogen, alkyl, chloro, carboxy, and carbomethoxy and

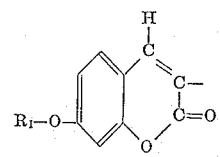

X is a bivalent alkyl residue having 1–4 carbon atoms; Y is an acid residue.

2. A material consisting essentially of at least one fiber component selected from the group consisting of polyacrylonitrile and synthetic polyesters, having incorporated therein a visible substantial brightening amount of a compound having the formula

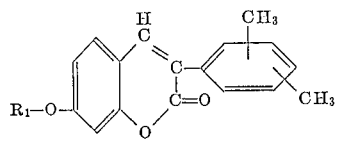

wherein $R_1$ is a member selected from the group consisting of methyl and acetyl.

3. A material consisting essentially of at least one fiber component selected from the group consisting of polyacrylonitrile and synthetic polyesters, having incorporated therein a visible substantial brightening amount of a compound having the formula

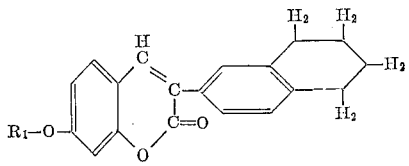

wherein $R_1$ is a member selected from the group consisting of methyl and acetyl.

References Cited
UNITED STATES PATENTS
2,878,138   3/1959   Raue et al. _____ 117—33.5
2,929,822   3/1960   Hausermann _____ 117—33.5

FOREIGN PATENTS
214,444   12/1956   Australia.
221,256   9/1956   Australia.

OTHER REFERENCES
Landolt: "Fluorescent Bleaching," American Dyestuff Report, Apr. 18, 1949, pp. 353–356.

Goodwin et al.: "Fluorescence of Coumarin Derivatives as a Function of pH," Arch. of Biochem. and Biophysics, vol. 27, 1950, QP501.A77, pp. 152–173.

WILLIAM D. MARTIN, *Primary Examiner.*

S. W. ROTHSTEIN, T. G. DAVIS, *Examiners.*